(12) United States Patent
Sakai

(10) Patent No.: US 8,590,120 B2
(45) Date of Patent: Nov. 26, 2013

(54) CONNECTOR

(75) Inventor: Yuta Sakai, Osaka (JP)

(73) Assignee: Doggyman H.A. Co., Ltd., Osaka (JP)

( * ) Notice: Subject to any disclaimer, the term of this patent is extended or adjusted under 35 U.S.C. 154(b) by 16 days.

(21) Appl. No.: 13/454,783

(22) Filed: Apr. 24, 2012

(65) Prior Publication Data

US 2013/0086778 A1    Apr. 11, 2013

(30) Foreign Application Priority Data

Oct. 6, 2011   (JP) ................................ P2011-222009

(51) Int. Cl.
*B66C 1/36*       (2006.01)
*F16B 45/04*      (2006.01)

(52) U.S. Cl.
USPC ...................... 24/600.7; 24/600.8; 294/82.17

(58) Field of Classification Search
None
See application file for complete search history.

(56) References Cited

U.S. PATENT DOCUMENTS

| | | | | |
|---|---|---|---|---|
| 559,233 A | * | 4/1896 | Tucker | 24/600.7 |
| 639,309 A | * | 12/1899 | Stewart | 24/599.4 |
| 950,641 A | * | 3/1910 | Sands | 294/82.17 |
| 3,082,502 A | * | 3/1963 | Van Gelder | 294/82.19 |
| 4,689,860 A | | 9/1987 | Suchowski | |
| 5,480,202 A | * | 1/1996 | Gloden | 294/82.2 |
| 7,051,410 B2 | * | 5/2006 | Simond | 24/600.9 |
| 7,946,006 B2 | * | 5/2011 | Thompson | 24/599.1 |

FOREIGN PATENT DOCUMENTS

| | | |
|---|---|---|
| JP | 62-288711 A | 12/1987 |
| JP | 2009-72080 A | 4/2009 |
| JP | 2010-081902 A | 4/2010 |

* cited by examiner

*Primary Examiner* — Jack W. Lavinder
(74) *Attorney, Agent, or Firm* — Birch, Stewart, Kolasch & Birch, LLP

(57) ABSTRACT

Easily-manufacturable connector capable of prevention of accidental opening of mouth of hook caused by movement of opening-closing rod in opening direction. Connector main body has paired retaining holes on both sides of hook base part. Misoperation-preventive member has its opposite ends formed into paired inwardly-bent engagement portions engageable in paired retaining holes, and has its midway part configured to be movable from front end of hook toward opening-operation body and vice versa in in-contact/out-of-contact relation. Paired engagement portions (paired retaining holes) are axially staggered so that midway part of misoperation-preventive member is urged from front end of hook toward opening-operation body. Connector main body has stopper for bringing midway part of misoperation-preventive member to stop in a position close to opening-operation body against urgence on misoperation-preventive member.

2 Claims, 6 Drawing Sheets

CONNECTOR

TECHNICAL FIELD

The present invention relates to a connector for use in, for example, tying a leash, a tether, or the like to a retaining ring attached to an accessory such as a collar or a harness worn by a household pet such as a dog.

BACKGROUND ART

There is a heretofore known connector comprising a connector main body with a hook at one end, the connector main body including a housing hole formed so as to open toward the front end of the hook; a guide slot formed along the housing hole for communication between the housing hole and the exterior thereof; an opening-closing rod retained in the housing hole in movable relation toward and away from the front end of the hook, for openably closing the mouth of the hook; a spring placed in the housing hole for urging the opening-closing rod in a direction to close the mouth, or closing direction; and an outwardly protruding opening-operation body attached to the opening-closing rod through a coupling portion which slides in the guide slot. See, for example, Japanese Unexamined Patent Publication JP-A 62-288711 (1987).

As shown in FIG. 6, for example, a conventional connector of such a type is fitted, at its hook, to a ring or other attached to an accessory such as a collar or a harness worn by a pet such as a dog for connection with a leash, a tether, or the like. During use, however, as a pet such as a dog moves around, the opening-operation body may be accidentally pressed, thereby moving the opening-closing rod in a direction to open the mouth, or opening direction. In this case, the mouth of the hook is opened with the consequent accidental detachment of the connector from e.g. the ring.

In this regard, there is another conventional connector designed with the aim of preventing the connector from accidentally becoming detached from the retaining ring. That is, a locking groove is formed in the connector main body by branching the guide slot, and the coupling portion of the opening-operation body is made engageable in the locking groove. Upon the engagement of the coupling portion in the locking groove, the opening-closing rod is locked in a closing position to close the mouth of the hook, whereby the mouth of the hook is restrained from being opened. See, for example, Japanese Unexamined Patent Publication JP-A 2009-72080.

SUMMARY OF THE INVENTION

Problems to be Solved by the Invention

However, in the conventional connector as above described, the locking groove which communicates with the guide slot needs to be formed in the shape of e.g. the letter L in the connector main body. This created a need to perform complicated working operation on the connector main body.

The present invention has been devised in view of the problem as mentioned supra, and accordingly its object is to provide an easily-manufacturable connector capable of prevention of accidental opening of a mouth of a hook caused by a movement of an opening-closing rod in an opening direction.

Means for Solving the Problem

Concrete means taken by the present invention to solve the problem will be shown below.

By way of the implementation of technical means for solving the technical problem in accordance with the present invention, there is provided a connector comprising a connector main body 3 with a hook 2 at one end, the connector main body 3 including a housing hole 5 formed so as to open toward the front end of the hook 2; a guide slot 7 formed along the housing hole 5 for communication between the housing hole 5 and the exterior thereof; an opening-closing rod 10 retained in the housing hole 5 in movable relation toward and away from the front end of the hook 2, for openably closing a mouth 4 of the hook 2; a spring 11 placed in the housing hole 5 for urging the opening-closing rod 10 in a direction to close the mouth, or closing direction; and an outwardly protruding opening-operation body 13 attached to the opening-closing rod 10 through a coupling portion 12 which slides in the guide slot 7. In this construction, the connector main body 3 is formed with a pair of retaining holes 20 and 21 that are located on both sides of the hook 2 base part, and a ring-shaped misoperation-preventive member 23 made of an elastic wire rod. The misoperation-preventive member 23 has its opposite ends formed into a pair of inwardly-bent engagement portions 26 and 27 that are engaged in the paired retaining holes 20 and 21, respectively. A midway part 23a of the misoperation-preventive member 23 is configured to be movable in a direction from the front end of the hook 2 toward the opening-operation body 13 and vice versa in an in-contact/out-of-contact relation with them. The paired engagement portions 26 and 27, as well as the paired retaining holes 20 and 21, are axially staggered with respect to each other, so that the midway part 23a of the misoperation-preventive member 23 can be urged in the direction from the front end of the hook 2 toward the opening-operation body 13. Moreover, the connector main body 3 is formed with a stopper 28 for bringing the midway part 23a of the misoperation-preventive member 23 to a stop in a position close to the opening-operation body 13 against the urgence on the misoperation-preventive member 23.

As another aspect of the technical means of the present invention, the paired retaining holes 20 and 21 are made to have a dimension shorter than the thickness of the connector main body 3, so that the bottoms of the retaining holes 20 and 21 can be spaced apart, with a thickness-wise midportion of the connector main body 3 lying between them.

Advantageous Effects of the Invention

According to the present invention, for example, when the connector is fitted at its hook to a retaining ring attached to an accessory such as a collar or a harness worn by a pet such as a dog for connection with a leash, a tether, or the like, even if a pet such as a dog moves around very actively during its use, by virtue of the misoperation-preventive member, the opening-operation body can be prevented from being accidentally pressed. This makes it possible to avoid that the opening-closing rod is accidentally moved in the opening direction to open the mouth of the hook with the consequent accidental detachment of the connector from the retaining ring.

Moreover, the attachment of the ring-shaped misoperation-preventive member to the connector main body can be made simply by engaging the paired engagement portions of the misoperation-preventive member in the paired retaining holes of the connector main body. Therefore, all that needs to be done is simply to form a pair of retaining holes on both sides of the hook base part in the connector main body. That is, there is no need to perform complicated working operation, such as formation of locking grooves, on the connector main body, thus facilitating the manufacture of the connector.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF DRAWINGS

The present invention will become more fully understood from the detailed description given hereinbelow and the accompanying drawings which are given by way of illustration only, and thus are not limitative of the present invention, and wherein.

MODES FOR CARRYING OUT THE INVENTION

Figure 1:
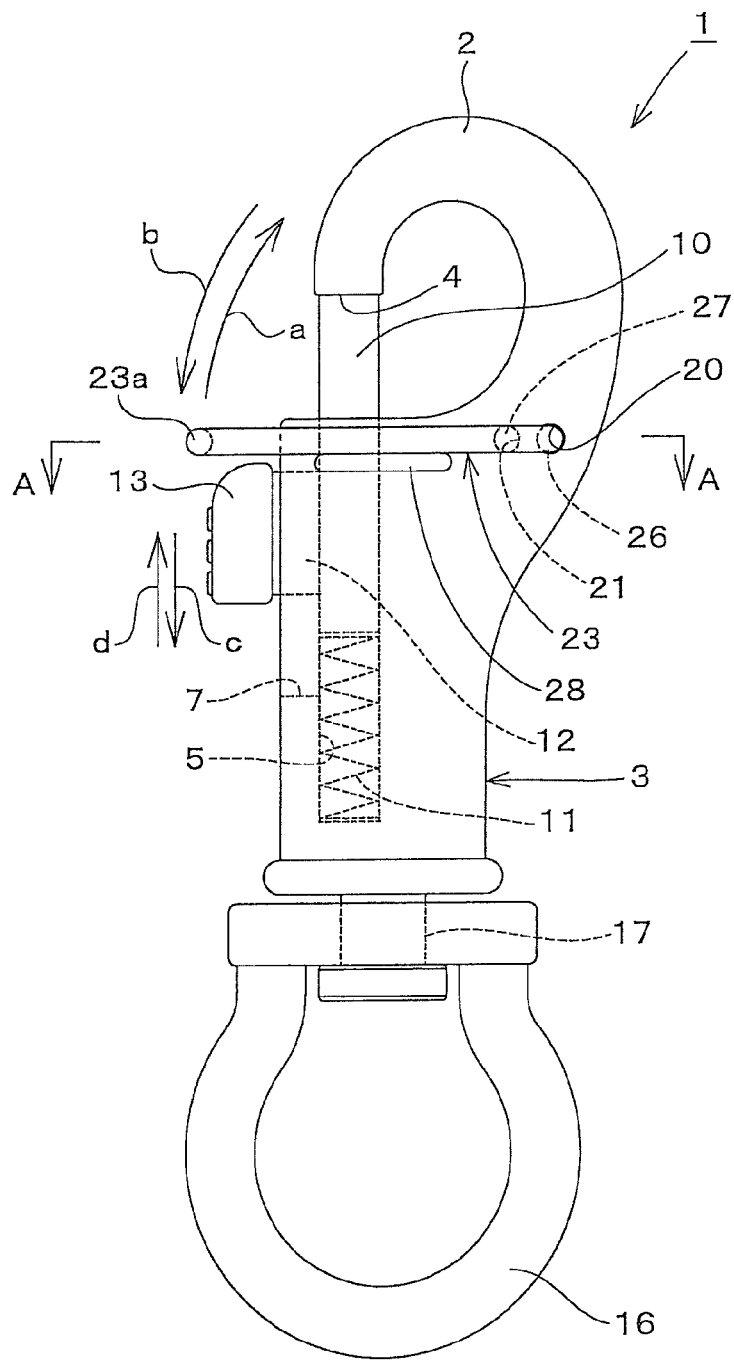
FIG. 1 is a side view of a connector in accordance with the first embodiment of the present invention.
Figure 2:
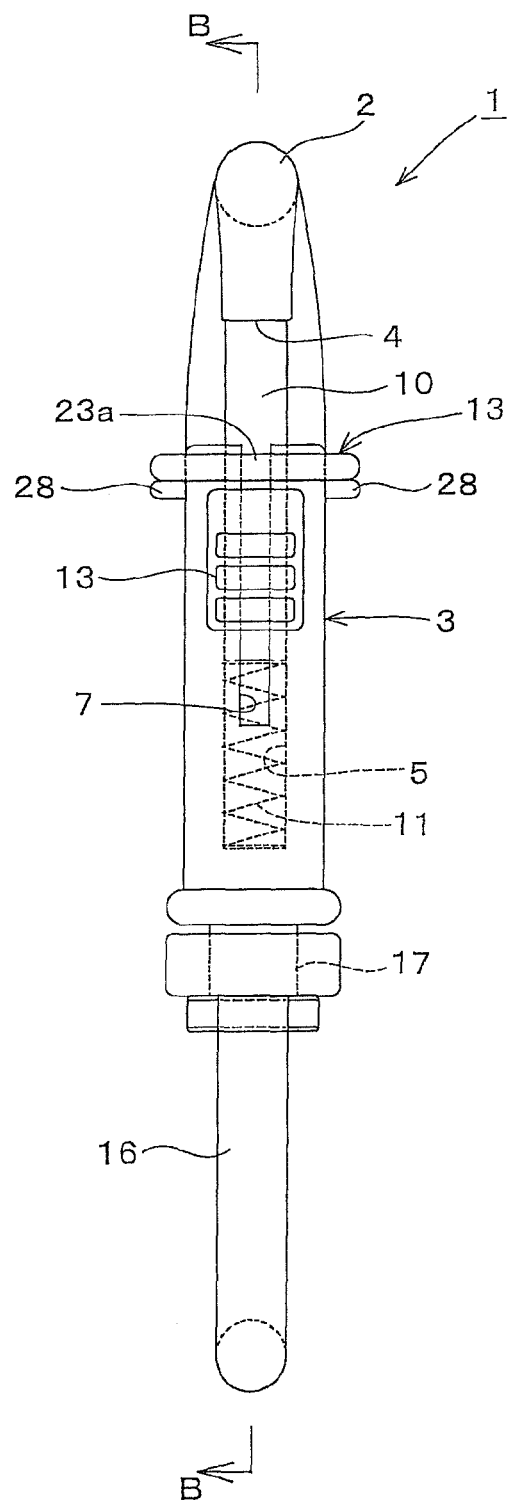
FIG. 2 is a front view of the connector.

Hereinafter, an embodiment of the present invention will be described with reference to the drawings. In FIGS. 1 to 5, a connector 1 comprises a connector main body 3 with a hook 2 at one end. A mouth 4 is located between the hook 2 and the connector main body 3. The connector main body 3 is formed with a circular housing hole 5 opened toward the front end of the hook 2, which extends in the direction of the length of the connector main body 3. Moreover, a guide slot 7 is formed along the housing hole 5 for communication between the housing hole 5 and the exterior thereof.

The connector 1 includes an opening-closing rod 10 retained in the housing hole 5 in movable relation toward and away from the front end of the hook 2 for openably closing the mouth 4 of the hook 2; a coil spring 11 placed in the housing hole 5 for urging the opening-closing rod 10 in a direction to close the mouth, or closing direction; and an outwardly protruding opening-operation body 13 attached to the opening-closing rod 10 through a coupling portion 12 which slides in the guide slot 7.

The connector 1 has a connecting ring 16 formed at the other end (an end opposite to the end formed with the hook 2). The connecting ring 16 is supported for free rotation about a mounting shaft 17.

It is noted that the connector main body 3, the opening-closing rod 10, the opening-operation body 13, the connecting ring 16, and so forth are each made of metal.

The connector main body 3 is formed with a pair of right-hand and left-hand retaining holes 20 and 21 that are located on both sides of the hook 2 base part in the direction of the thickness thereof, or thickness-wise direction, and a misoperation-preventive member 23 located at that part thereof toward the hook 2. The misoperation-preventive member 23 is made of an elastic wire rod shaped like a ring having the form of the letter U when viewed in plane, and has its opposite ends formed into a pair of engagement portions 26 and 27 that are bent inwardly in a right-left direction, or horizontal direction (in the thickness-wise direction of the connector main body 3). The paired engagement portions 26 and 27 are engaged in the paired retaining holes 20 and 21, respectively. Apart located midway between the ends of the misoperation-preventive member 23, or a midway part 23a of the misoperation-preventive member 23 is configured to be movable (rockable) about the engagement portion 26, 27 serving as a pivot in a direction from the front end of the hook 2 toward the opening-operation body 13 and vice versa, namely both in a direction a and a direction b, in an in-contact/out-of-contact relation with them.

The paired engagement portions 26 and 27, as well as the paired retaining holes 20 and 21, are so arranged that their axes are displaced in relation to each other in a front-rear direction. That is, one of the engagement portions, or one engagement portion 26 (retaining hole 20) and the other, or the other engagement portion 27 (retaining hole 21) are staggered in the front-rear direction. With this arrangement, as the misoperation-preventive member 23 is rocked about the engagement portion 26, 27 serving as a pivot in the direction away from the opening-operation body 13 (the direction a), under a restoring force resulting from torsional elastic deformation of the misoperation-preventive member 23, the midway part 23a of the misoperation-preventive member 23 is urged in the direction b, namely from the front end of the hook 2 toward the opening-operation body 13. The connector main body 3 is formed with a pair of right-hand and left-hand stoppers 28 that are located on both sides of that part thereof toward the hook 2 in the thickness-wise direction, for bringing the midway part 23a of the misoperation-preventive member 23 to a stop in a position close to the opening-operation body 13 against the urgence on the misoperation-preventive member 23.

Figure 3:
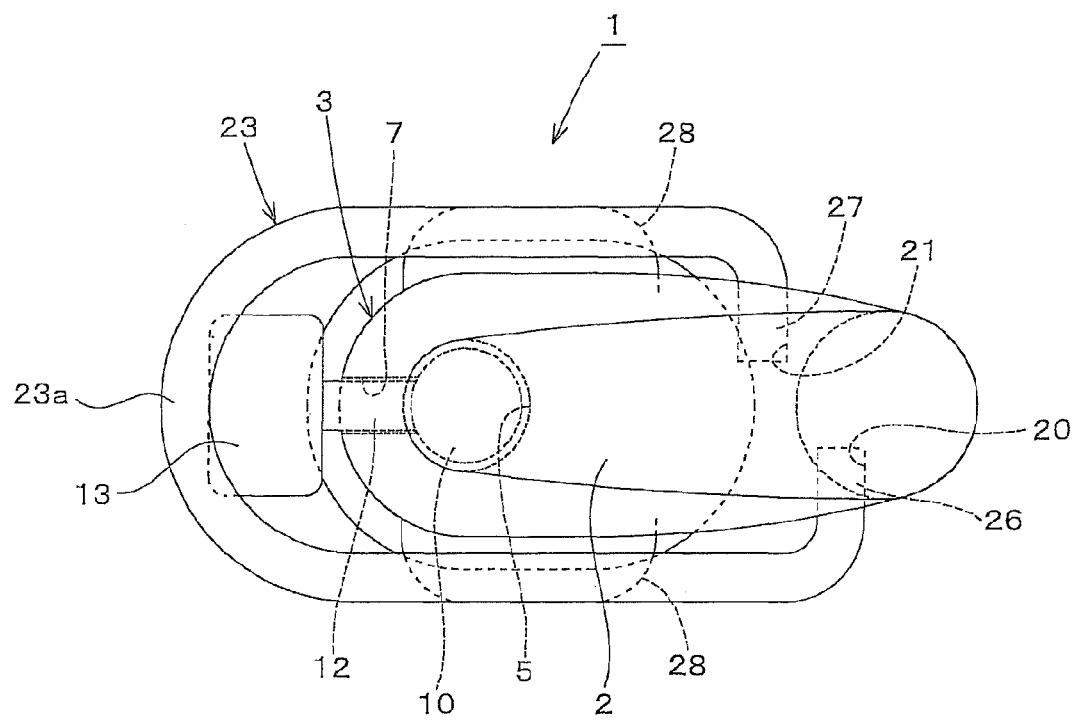
FIG. 3 is a top view of the connector.
Figure 4:
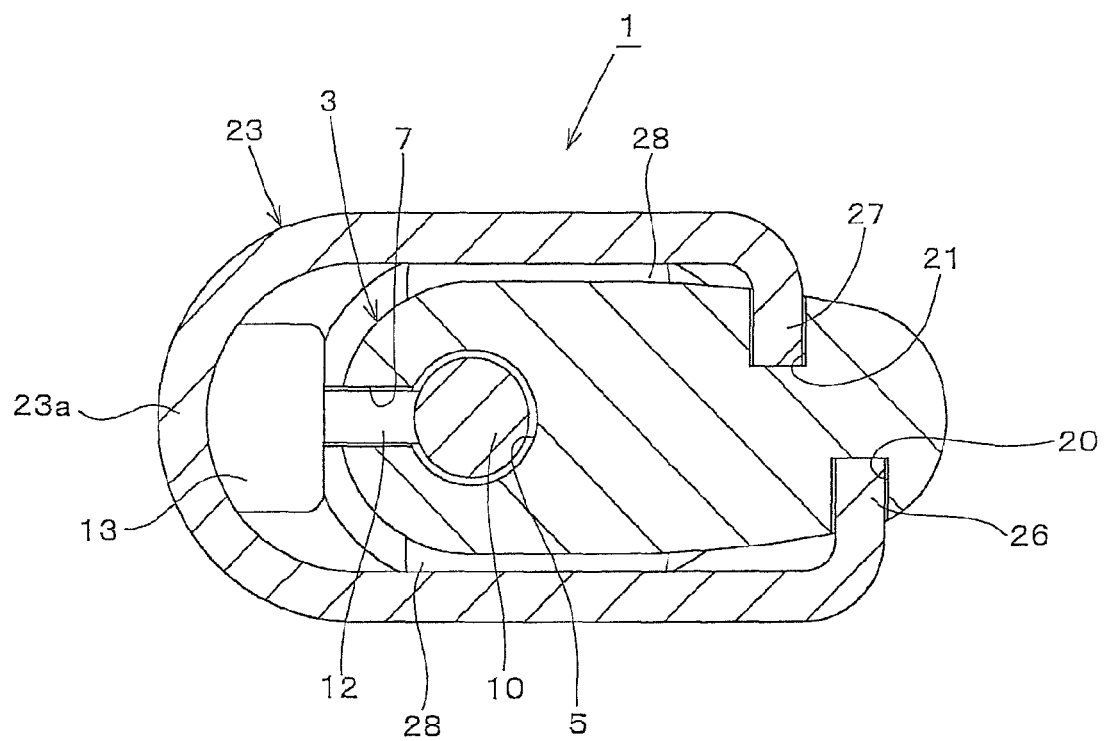
FIG. 4 is a sectional view of the connector taken along the line A-A of FIG. 1.
Figure 5:
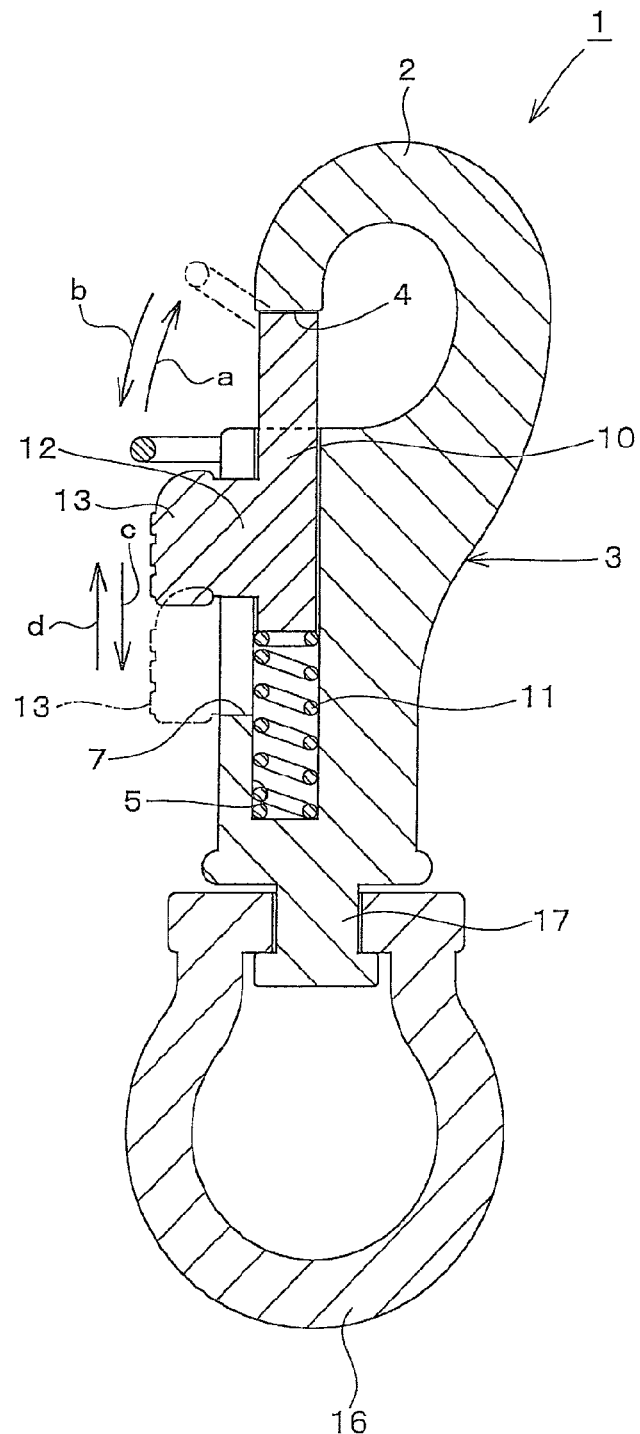
FIG. 5 is a sectional view of the connector taken along the line B-B of FIG. 2.

The paired retaining holes 20 and 21 are made to have a dimension shorter than the thickness of the connector main body 3, so that the bottoms of the retaining holes 20 and 21 can be spaced apart, with a thickness-wise midportion of the connector main body 3 lying between them. Moreover, with the misoperation-preventive member 23 kept in contact with the stopper 28, as shown in FIG. 3, the midway part 23a of the misoperation-preventive member 23 protrudes outward (forward) beyond the outer end (forward end) of the opening-operation body 13.

Figure 6:
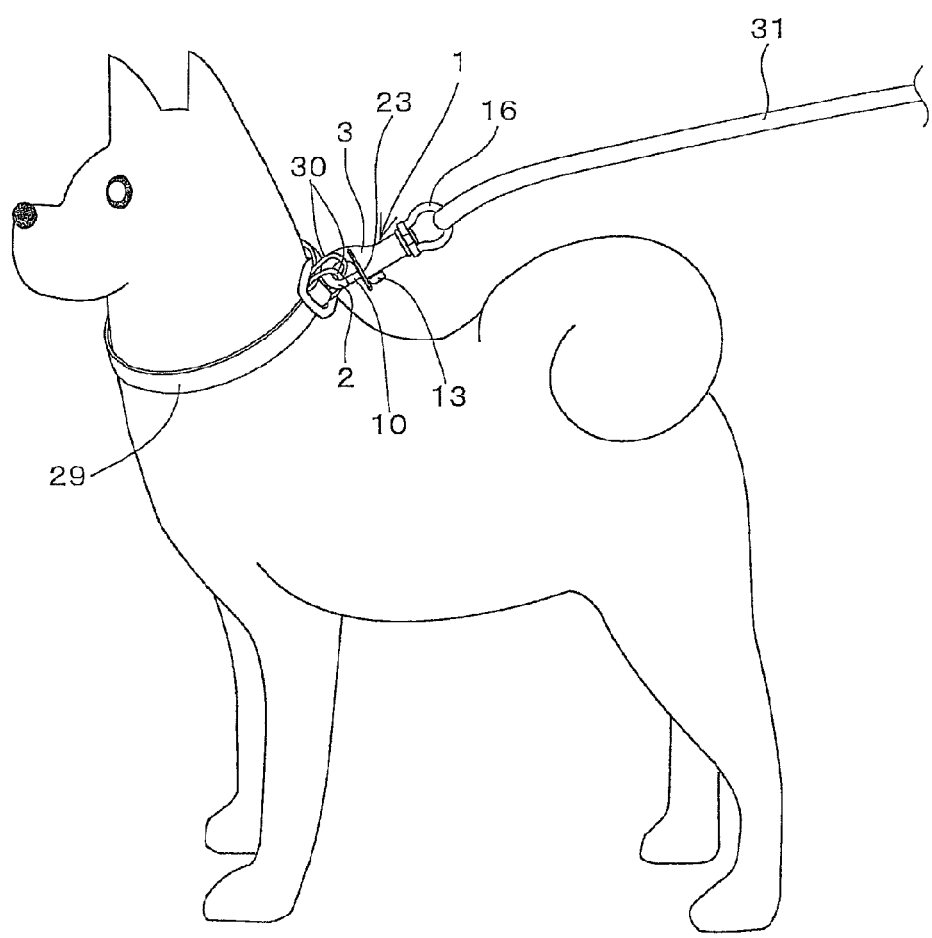
FIG. 6 is a perspective view showing how the connector is to be used.

According to the embodiment thus far described, for example, as shown in FIG. 6, when it is desired to connect a commodity 31 such as a leash or a tether to a retaining ring 30 attached to an accessory such as a collar 29 or a harness worn by a pet such as a dog, that connection can be made simply by engaging the hook 2 of the connector 1 coupled via the connecting ring 16 to the front end of the commodity 31 such as a leash or a tether with the retaining ring 30.

The engagement of the hook 2 of the connector 1 with the retaining ring 30 can be effected as follows. The misoperation-preventive member 23 is pressed in the direction a against the urgence exerted thereon to move the midway part 23a of the misoperation-preventive member 23 toward the front end of the hook 2, whereby the misoperation-preventive member 23 is moved away from the opening-operation body 13. Subsequently, the opening-operation body 13 is pressed in a direction c to move the opening-closing rod 10 in the direction c (opening direction) against the urging force of the coil spring 11, thereby opening the mouth 4 of the hook 2. In this state, the hook 2 is engaged with the retaining ring 30. After that, the pressing force exerted on the opening-operation body 13 in the direction c is released, and also the pressing force exerted on the misoperation-preventive member 23 in the direction a is released, whereupon the relevant components ranging from the opening-closing rod 10 to the opening-operation body 13 are moved in a direction d (closing direction) under the urging force of the coil spring 11, thereby closing the mouth 4 of the hook 2. Moreover, at this time, the misoperation-preventive member 23 is rocked in the direction b under the urgence exerted thereon so as to be brought into contact with the stopper 28 in the position close to the opening-operation body 13.

Therefore, even if a pet such as a dog moves around very actively under the condition that the hook 2 is kept in engagement with the retaining ring 30, by virtue of the misoperation-preventive member 23, the opening-operation body 13 can be prevented from being pressed in the opening direction (direction c) effectively. This makes it possible to avoid without fail that the opening-closing rod 10 is accidentally moved in the opening direction to open the mouth 4 of the hook 2 with the consequent accidental detachment of the connector 1 from the retaining ring 30.

On the other hand, the disengagement of the hook 2 of the connector 1 from the retaining ring 30 can be effected as follows. As in the case of engaging the hook 2 with the retaining ring 30, the misoperation-preventive member 23 is pressed in the direction a against the urgence exerted thereon to move the midway part 23a of the misoperation-preventive member 23 toward the front end of the hook 2, whereby the misoperation-preventive member 23 is moved away from the opening-operation body 13. Subsequently, the opening-operation body 13 is pressed in the direction c to move the opening-closing rod 10 in the direction c (opening direction) against the urging force of the coil spring 11, thereby opening the mouth 4 of the hook 2. In this state, the hook 2 can be disengaged from the retaining ring 30. Accordingly, the hook 2 can be disengaged from the retaining ring 30 with ease.

Moreover, the attachment of the ring-shaped misoperation-preventive member 23 to the connector main body 3 can be made simply by engaging the paired engagement portions 26 and 27 of the misoperation-preventive member 23 in the paired retaining holes 20 and 21, respectively, of the connector main body 3. Therefore, all that needs to be done in the interest of the attachment of the misoperation-preventive member 23 to the connector main body 3 is simply to form a pair of retaining holes 20 and 21 on both sides of the hook 2 base part of the connector main body 3 in the thickness-wise direction. This makes it possible to eliminate the need to perform complicated working operation, such as formation of locking grooves, on the connector main body 3, and thereby facilitate the manufacture of the connector 1.

Further, the paired retaining holes 20 and 21 are made to have a dimension shorter than the thickness of the connector main body 3, so that the bottoms of the retaining holes 20 and 21 can be spaced apart, with the thickness-wise midportion of the connector main body 3 lying between them. In addition, the paired retaining holes 20 and 21 are axially staggered with respect to each other. Thus, it never occurs that the rigidity of the connector main body 3 is significantly decreased due to the formation of the paired retaining holes 20 and 21 in the connector main body 3. Accordingly, the connector 1 can be used for longer periods of time.

While, in the foregoing embodiment, the connector 1 is illustrated as being used to connect the commodity 31 such as a leash or a tether to the retaining ring 30 attached to an accessory such as the collar 29 or a harness worn by a pet such as a dog, the application of the connector 1 is not so limited.

For example, the connector 1 can be used for the crane transportation of cargo tied to wire rope, and can also be used for the attachment of a detachable strap to a shoulder bag.

Moreover, in the foregoing embodiment, the paired engagement portions 26 and 27 are axially staggered with respect to each other in the front-rear direction. Alternatively, the paired engagement portions 26 and 27 (the paired retaining holes 20 and 21) may be axially staggered with respect to each other in an obliquely forward and downward direction. In this case, the misoperation-preventive member 23 can be held in place in contact with the stopper 28 more firmly.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

The invention claimed is:

1. A connector comprising: a connector main body with a hook at one end, the connector main body including a housing hole formed so as to open toward a front end of the hook; a guide slot formed along the housing hole for communication between the housing hole and the exterior thereof; an opening-closing rod retained in said housing hole in movable relation toward and away from the front end of the hook, for openably closing a mouth of the hook; a spring placed in said housing hole for urging the opening-closing rod in a closing direction; and an outwardly protruding opening-operation body attached to the opening-closing rod through a coupling portion which slides in the guide slot, wherein the connector main body has a pair of retaining holes that are located on both sides of the hook base part, and a ring-shaped misoperation-preventive member made of an elastic wire rod, the misoperation-preventive member having its opposite ends formed into a pair of inwardly-bent engagement portions that are engaged in said paired retaining holes, respectively, and having its midway part configured to be movable in a direction from the front end of the hook toward the opening-operation body and vice versa in an in-contact/out-of-contact relation with them, wherein said paired engagement portions, as well as said paired retaining holes, are axially staggered with respect to each other, so that the midway part of the misoperation-preventive member can be urged in the direction from the front end of the hook toward the opening-operation body, and wherein the connector main body has a stopper for bringing the midway part of the misoperation-preventive member to a stop in a position close to the opening-operation body against an urgence on said misoperation-preventive member.

2. The connector according to claim 1, wherein said paired retaining holes are made to have a dimension shorter than the thickness of the connector main body, so that the bottoms of the retaining holes can be spaced apart, with a thickness-wise midportion of the connector main body lying between them.

* * * * *